United States Patent
Hammerschmidt (10) Patent No.: US 9,518,881 B2
(45) Date of Patent: Dec. 13, 2016

(54) APPARATUS FOR DETECTING A FORCE EFFECT AND A METHOD FOR DETECTING A FORCE EFFECT

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 316 days.

(21) Appl. No.: 14/212,075

(22) Filed: Mar. 14, 2014

(65) Prior Publication Data

US 2014/0260691 A1    Sep. 18, 2014

(30) Foreign Application Priority Data

Mar. 15, 2013   (DE) ................ 10 2013 004 561

(51) Int. Cl.
  G01L 5/00      (2006.01)
  G01L 1/14      (2006.01)
  B60R 21/013    (2006.01)

(52) U.S. Cl.
  CPC ............ G01L 5/0052 (2013.01); G01L 1/142 (2013.01); B60R 21/013 (2013.01)

(58) Field of Classification Search
  CPC .......... G01L 5/0052; G01L 1/14; G01L 1/146; B60R 21/0133; B60R 21/0136; B60R 2021/343; B60R 21/0132; G06F 3/044
  See application file for complete search history.

(56) References Cited

U.S. PATENT DOCUMENTS 5,506,454 A * 4/1996 Hanzawa ............... B60R 21/01
                                                    180/272
5,583,290 A * 12/1996 Lewis ................... G01P 15/125
                                                    73/514.18

(Continued)

FOREIGN PATENT DOCUMENTS

DE      3801656        7/1987
GB      2435515 A      8/2007

OTHER PUBLICATIONS

Office Action from related German Application DE 102013004561. 4, dated Sep. 29, 2014, 6 pgs. English translation not provided.

(Continued)

Primary Examiner — Max Noori
Assistant Examiner — Tran M Tran
(74) Attorney, Agent, or Firm — Eschweiler & Associates, LLC (57) ABSTRACT

An apparatus for detecting a force effect comprises two electrical conductors which run at a distance from one another, a deformable spacer which is arranged between the two electrical conductors, a first measuring device which is electrically connected to one end of the two electrical conductors in each case and an electrical component which is electrically connected to the respective other end of the two electrical conductors. The first measuring device is designed to detect a change in a variable which can be measured by the measuring device, which change is caused by a change in the distance between the two electrical conductors which is caused by a force effect at at least one place along the two electrical conductors, in order to detect the force effect.

22 Claims, 5 Drawing Sheets

(56) References Cited

U.S. PATENT DOCUMENTS

| | | | | |
|---|---|---|---|---|
| 5,847,643 | A * | 12/1998 | Keith | B60Q 1/52 180/274 |
| 6,009,970 | A * | 1/2000 | Breed | B60R 19/483 180/274 |
| 6,561,301 | B1 * | 5/2003 | Hayashi | B60R 21/0136 180/274 |
| 6,728,320 | B1 * | 4/2004 | Khasnis | H04L 25/0266 375/257 |
| 6,744,264 | B2 * | 6/2004 | Gogoi | G01D 5/2405 324/658 |
| 6,832,145 | B2 * | 12/2004 | Takafuji | B60R 21/013 180/271 |
| 7,036,621 | B2 * | 5/2006 | Takafuji | B60R 21/0136 180/274 |
| 7,137,472 | B2 * | 11/2006 | Aoki | B60R 21/0136 180/274 |
| 7,150,179 | B2 * | 12/2006 | Takafuji | B60R 21/0136 73/12.09 |
| 7,236,866 | B2 * | 6/2007 | Takafuji | B60R 21/0132 180/168 |
| 7,353,087 | B2 * | 4/2008 | Takafuji | B60R 21/0136 280/728.1 |
| 7,364,222 | B2 * | 4/2008 | Tanabe | B60R 21/0136 293/4 |
| 7,368,921 | B2 * | 5/2008 | Deangelis | G01D 5/2405 324/661 |
| 7,387,619 | B2 * | 6/2008 | Kitamura | A61F 5/451 324/686 |
| 7,484,756 | B2 | 2/2009 | Le | |
| 7,578,195 | B2 * | 8/2009 | DeAngelis | G01L 1/146 324/687 |
| 7,737,833 | B2 * | 6/2010 | Takafuji | B60R 21/0132 180/274 |
| 7,756,680 | B2 * | 7/2010 | Hammerschmidt | G08C 25/00 702/183 |
| 7,782,180 | B2 * | 8/2010 | Takafuji | B60R 21/0136 340/425.5 |
| 7,916,007 | B2 * | 3/2011 | Takafuji | B60R 21/0136 180/274 |
| 8,058,993 | B2 | 11/2011 | Hammerschmidt | |
| 8,139,671 | B2 * | 3/2012 | Granger | A61B 6/56 375/285 |
| 8,384,399 | B2 * | 2/2013 | Hammerschmidt | B60R 21/01532 257/712 |
| 8,862,312 | B2 * | 10/2014 | Nehls | B60R 21/0136 340/436 |
| 8,919,211 | B1 * | 12/2014 | Hanson | G01L 1/146 73/862.626 |
| 8,941,392 | B1 * | 1/2015 | Reese | A61B 5/1071 324/658 |
| 8,972,116 | B2 * | 3/2015 | Leach | B60R 19/02 180/274 |
| 9,222,764 | B2 * | 12/2015 | Reese | A61B 5/1071 |
| 2005/0154530 | A1 * | 7/2005 | Hosokawa | B60R 21/013 701/301 |
| 2006/0196716 | A1 * | 9/2006 | Hawes | B60R 21/0136 180/274 |
| 2006/0198080 | A1 * | 9/2006 | Hawes | B60R 19/483 361/311 |
| 2014/0207330 | A1 * | 7/2014 | Meir | B60R 21/0136 701/33.9 |

OTHER PUBLICATIONS

Continental Automotive, *Pedestrian Protection Sensors*, 1 pages, © Continental AG 2013.

* cited by examiner

FIG. 7

APPARATUS FOR DETECTING A FORCE EFFECT AND A METHOD FOR DETECTING A FORCE EFFECT

RELATED APPLICATION

The present application claims priority to German Application No. DE102013004561.4 filed Mar. 15, 2013, which is incorporated herein by reference in its entirety.

TECHNICAL FIELD

Exemplary embodiments relate to the field of sensor systems and, in particular, to an apparatus for detecting a force effect and to a method for detecting a force effect.

BACKGROUND

There are numerous approaches for detecting the effect of a force on an object. For example, a wide variety of impact sensors have been developed in vehicle technology. However, with such sensors, it is important to be able to determine the functionality since this is a topic relevant to safety. In the case of sensor systems, it is generally desirable to be able to determine the functionality as reliably as possible.

There is therefore the need to provide a concept for detecting a force effect, which concept makes it possible to determine the functionality of the system with a high degree of reliability.

SUMMARY

Some exemplary embodiments relate to an apparatus for detecting a force effect, which apparatus has two electrical conductors which run at a distance from one another, a deformable spacer which is arranged between the two electrical conductors, a first measuring device which is electrically connected to one end of the two electrical conductors in each case and an electrical component which is electrically connected to the respective other end of the two electrical conductors. The first measuring device is designed to detect a change in a variable which can be measured by the measuring device, which change is caused by a change in the distance between the two electrical conductors which is caused by a force effect at at least one place along the two electrical conductors, in order to detect the force effect.

The use of a first measuring device and an electrical component (for example second measuring device or non-reactive resistor) which are connected to one another via two electrical conductors makes it possible to detect the force effect on the basis of a capacitance measurement. The two electrical conductors between the first measuring device and the electrical component make it possible for the first measuring device to carry out an electrical functional test on the two electrical conductors and/or the electrical component. The structure described can therefore provide the possibility of electrical functional tests, thus making it possible to considerably increase the reliability with which the functionality of the apparatus is assessed.

In some exemplary embodiments, the electrical component is a second measuring device. Both measuring devices can then be designed to detect a change in a variable which can be measured by the measuring devices, which change is caused by a change in the distance between the two electrical conductors which is caused by a force effect at at least one place along the two electrical conductors, in order to detect the force effect.

In this case, both measuring devices can detect a force effect on the basis of the same principle (for example a capacitance measurement) or the measuring devices may carry out the detection using different physical principles (for example one on the basis of a capacitance measurement and the other on the basis of a pressure measurement). This makes it possible to increase functionality and/or reliability of the apparatus.

In some exemplary embodiments, the first measuring device is designed to record a test signal dependent on the second measuring device using at least one conductor of the two electrical conductors in a test mode, with the result that functionality of the apparatus can be assessed on the basis of the recorded test signal. In this manner, a measuring device can obtain information relating to at least one state of the two electrical conductors and/or the second measuring device, which information can be used alone or in combination with other parameters or information to assess the functionality of the apparatus. This makes it possible to determine the functionality of the apparatus with a high degree of reliability.

Some exemplary embodiments relate to two measuring devices which are designed to detect a change in a capacitance between the two electrical conductors which is caused by a change in the distance between the two electrical conductors at at least one place. This makes it possible to easily and reliably detect a force effect.

In some exemplary embodiments, the apparatus additionally has an electrical control device. The control device can receive a recorded test signal at least from one of the two measuring devices and can compare said test signal with a reference signal or a test signal from the other measuring device in order to assess functionality of the apparatus. A central control device can obtain information from both measuring devices, which information can be used to assess the functionality of the apparatus. This makes it possible to determine the functionality with a high degree of reliability.

In some exemplary embodiments, the electrical component is a resistor which is arranged between the two other ends of the two electrical conductors. In this case, the measuring device is designed to detect a change in capacitance between the two electrical conductors which is caused by a change in the distance between the two electrical conductors which is caused by the impact at at least one place along the electrical conductors, in order to detect a force effect.

The use of two electrical conductors spaced apart by a deformable spacer makes it possible to implement an impact sensor which can detect an impact by means of a capacitive measurement. Furthermore, a statement on the state of the electrical conductors can be easily made (for example by means of resistance measurement) by terminating the two electrical conductors with a resistor. This makes it possible to assess the functionality of the apparatus with a high degree of reliability.

Some exemplary embodiments relate to a bumper of a vehicle having an apparatus according to the concept described above. In this case, the apparatus is directly or indirectly connected to the bumper, with the result that, in the event of an impact with an object, the distance between the two electrical conductors is changed at at least one place as a result of a resulting force effect on the apparatus. This makes it possible to determine an impact with an object in a vehicle with a high degree of reliability.

BRIEF DESCRIPTION OF THE DRAWINGS

Exemplary embodiments are explained in more detail below with reference to the accompanying figures, in which.

DETAILED DESCRIPTION

In the following description of the accompanying figures which show exemplary embodiments, identical reference symbols denote identical or comparable components. Furthermore, collective reference symbols are used for components and objects which occur several times in an exemplary embodiment or in a drawing but are described together with respect to one or more features. Components or objects which are described using identical or collective reference symbols may have the same design but possibly also a different design with respect to individual, several or all features, for example their dimensions, if the description does not explicitly or implicitly reveal otherwise.

Exemplary embodiments in which the (other) electrical component is a second measuring device are explained in more detail below. However, the statements also accordingly apply if the electrical component is another element, for example a non-reactive resistor.

Figure 1:
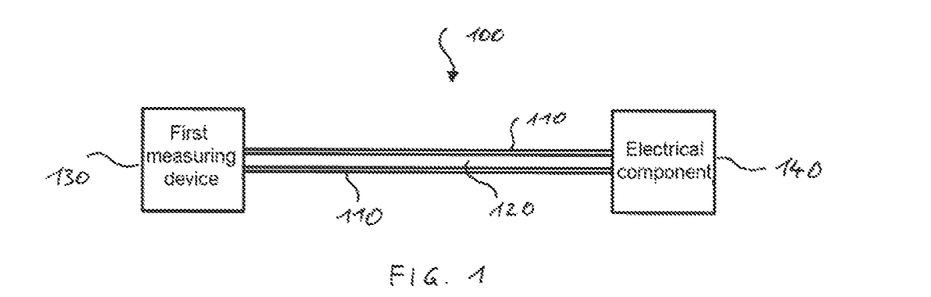
FIG. 1 shows a schematic illustration of an apparatus for detecting a force effect.

FIG. 1 shows a schematic illustration of an apparatus 100 for detecting a force effect according to one exemplary embodiment. The apparatus 100 comprises two electrical conductors which run at a distance from one another and a deformable spacer which is arranged between the two electrical conductors. The apparatus 100 also has a first measuring device 130 which is electrically connected to one end of the two electrical conductors in each case and a second measuring device (as an example of an electrical component 140) which is electrically connected to the respective other end of the two electrical conductors 110. The two measuring devices can detect a change in a variable which can be measured by the measuring devices, which change is caused by a change in the distance between the two electrical conductors 110 which results from a force effect at at least one place along the two electrical conductors 110, in order to detect the force effect.

The use of two independent measuring apparatuses which are connected to one another via two electrical conductors 110 makes it possible to detect the force effect on the basis of a capacitance measurement. In this case, both measuring apparatuses can detect a force effect on the basis of the same principle (for example a capacitance measurement), or the measuring apparatuses may carry out the detection using different physical principles (for example one on the basis of a capacitance measurement and the other on the basis of a pressure measurement). This makes it possible to increase the functionality and/or reliability of the apparatus. Furthermore, the two electrical conductors 110 between the measuring apparatuses enable communication between the two measuring apparatuses or make it possible for the respective other measuring apparatus to at least influence electrical signals. The structure described can therefore provide the possibility of electrical functional tests, thus making it possible to considerably increase the reliability with which the functionality of the apparatus is assessed.

The two conductors 110 are spaced apart from one another by the spacer 120. In this case, the distance between the two conductors can vary or may also be substantially constant (for example apart from a deviation of at most 10%, 5% or 1% of the distance). The two electrical conductors 110 may run in a straight line or else may run in any desired other form (for example along a curve, in a meandering, circular-arc, spiral or undulating manner). The electrical conductors 110 and the deformable spacer 120 in between them can therefore be used in a wide variety of applications and at a wide variety of locations since the apparatus 100 can be adapted in a very flexible manner to the geometry of the use environment.

One electrical conductor (for example a wire) extends considerably further (for example more than 50 times, more than 100 times or more than 1000 times as far) in one dimension (in its length) than in the two other dimensions (width and height of the cross section of the electrical conductor).

The two electrical conductors 110 have an electrically conductive material, with the result that the two measuring devices are electrically connected to one another via the electrical conductors 110. For example, the electrical conductors may be wires (for example made of copper, aluminum, a copper alloy or another metal alloy). The distance between the two conductors 110 may vary in a wide range, but the distance between the two conductors 110 is constant, for example in the case of a substantially constant force effect or without a force effect. The distance between the two electrical conductors is changed, only if a force effect is changed or a force effect occurs, as a result of the deformability of the spacer (and deformability of the electrical conductors).

The spacer 120 can be directly or indirectly connected to the electrical conductors 110. The spacer 120 may have material, with the result that the two electrical conductors 110 are electrically insulated from one another by the spacer 120 in between them. Alternatively, an electrically insulating layer may also be arranged, for example, between at least one electrical conductor 110 and the spacer 120. For example, the two electrical conductors may be surrounded by an electrically insulating sheath. The deformability of the spacer 120 makes it possible to change the distance between the two electrical conductors 110 by means of a force effect (at least at the place of the force effect), which can be detected by the measuring devices directly (for example by means of an electrical measurement) or indirectly (for example by means of a pressure measurement). For this purpose, the spacer 120 may have a material or may consist of a material which is easier to deform in comparison with materials (for example steel) which surround the apparatus 100 in a respective application or to which the apparatus 100 is fastened, for example. The spacer 120 may be an elastomer (for example rubber) or a foam, for example, or may consist thereof or may be in the form of a tube or a hollow body made of such a material. Furthermore, the two electrical conductors 110, for example, are easier to deform than the spacer 120 or at least can be deformed in a substantially similar manner to the spacer 120, with the result that the two electrical conductors 110 substantially follow deformation of the spacer 120. For example, in the event of a force effect on one of the two electrical conductors 110, this conductor can be pressed into the deformable spacer 120, with the result that the distance between the two electrical conductors 110 changes at this place.

One of the measuring devices is respectively arranged at one end of the two electrical conductors 110 and is electrically connected to the two ends of the two electrical conductors 110 at the respective end. In this case, the distance between the two electrical conductors 110 may decrease in the end regions toward the measuring devices, with the result that the two ends of the electrical conductors 110 can be connected to two connections of the respective measuring device which are close to one another in a space-saving manner.

The first measuring device 130 is therefore electrically connected to a first end of the first electrical conductor of the two electrical conductors 110 and is electrically connected to a first end of the second electrical conductor of the two electrical conductors 110, and the second measuring device 240 is electrically connected to a second end of the first electrical conductor of the two electrical conductors 110 and is electrically connected to a second end of the second electrical conductor of the two electrical conductors 110. The two measuring devices may be arranged at (virtually) any desired distance from one another. The two electrical conductors 110 can then have a corresponding length which corresponds at least to the distance between the two measuring devices. However, the two electrical conductors 110 may also be longer than the distance between the two measuring devices if they do not connect the two measuring devices to one another in a straight line. The spacer 120 may be substantially the same length as or shorter than (for example in order to provide space for connection to the measuring devices at the ends) the two electrical conductors 110.

The two measuring devices may have the same or identical structure and/or may have the same or identical functionality or else may carry out at least partially different functionalities. For example, the two measuring devices may be designed to detect a change in the same variable (for example capacitance of the two electrical conductors). Alternatively, the two measuring devices may also detect the change in different variables. For example, the first measuring device 130 may detect or record the change in a capacitance of the two electrical conductors 110 and the second measuring device 240 may detect or record a change in a pressure in a cavity of the spacer 120.

One measuring device may be an electrical circuit which can record a desired measurable variable and can generate an electrical signal containing information on the measured variable and can optionally provide said signal for further processing. This may be, for example, a capacitance sensor, a voltage sensor, a current sensor, a resistance sensor or a pressure sensor.

The measurable variable may be any desired variable which changes directly (for example capacitance change) or indirectly (for example pressure change in a cavity in the spacer) when the distance between the two electrical conductors 110 changes under a force effect. For example, the measurable variable may be a capacitance of the two electrical conductors, a resistance of at least one of the two conductors or a voltage of a voltage signal received via at least one of the two conductors 110 or a current of a current signal.

A force effect may result in deformation of at least one of the two electrical conductors 110 and consequently of the deformable spacer 120. This may be effected, for example, either by a force effect on the spacer 120, which then concomitantly deforms the electrical conductor fastened thereto, or on the electrical conductor directly which then accordingly concomitantly deforms the spacer 120. The force effect may be effected, for example, via a component to which the apparatus 100 is fastened in the respective application or directly via an object which strikes the apparatus (in particular the two electrical conductors 110 with the spacer 120 in between them). Accordingly, the force effect may be caused by a wide variety of operations (for example impact of an object with a bumper of a vehicle or jamming of an object in a window winder).

The force effect may extend over the entire length of the two electrical conductors 110. However, in most applications, the force effect will be limited to part of the length of the two electrical conductors 110 or else only to one place or a very limited range of the length of the two electrical conductors 110. However, the described concept for detecting a force effect can be used independently thereof.

The spacer 120 may be implemented in different ways. There are many possibilities both in terms of the choice of the materials used and in terms of the geometrical shape. For example, the spacer may be a tube (for example made of an elastomer) or a foam body.

The choice of a material for the spacer 120 and the dimensioning of the electrical conductors 110 make it possible to stipulate the minimum force effect as of which the result may be deformation of the spacer 120 and of the electrical conductors 110 and therefore a change in the distance between the two electrical conductors 110. If a material which can be deformed less quickly is selected, small force effects cannot be detected, but the service life of the apparatus 110 can be increased and/or the risk of incorrect detection can be reduced. Accordingly, smaller force effects can already be detected with a material which can be deformed more easily.

The electrical connection between the two measuring devices makes it possible for the measuring devices to communicate with one another or to at least send signals via the conductors 110 and record corresponding resultant signals which can be received via the conductors or one of the two conductors in order to be able to make a statement on the functionality of the two electrical conductors 110 and/or the respective other measuring device.

In other words, the first measuring device 130 (and also the second measuring device) can optionally record a test signal dependent on the second measuring device (or generally the electrical component 140) via at least one conductor of the two electrical conductors in a test mode, with the result that functionality of the apparatus can be assessed on the basis of the recorded test signal. The test signal to be recorded may be a signal transmitted by the second measuring device or a signal which results in response to a signal applied to at least one of the two conductors by the first measuring device 130. In this respect, the test signal to be recorded may be a signal directly dependent on the second measuring device (in the case of a signal transmitted by the second measuring device) or indirectly dependent on the second measuring device (a signal which is applied to one of the two conductors by the first measuring device and is influenced by the second measuring device at the other end of the two electrical conductors). As a result of the fact that the test signal has been received at least via one conductor and depends on the second measuring device, a statement on the functionality of the apparatus 100 can be made on the basis of such a test signal. For example, the test signal or an item of information included in the test signal can be compared with a reference or with a corresponding value recorded by the second measuring device.

As a result of the second measuring devices being connected to two electrical conductors 110, the functionality of the apparatus 100 can also be tested in a simple manner in addition to the possibility of capacitively detecting a force effect. This makes it possible to considerably increase the reliability when assessing the functionality.

A test mode of a measuring device is, for example, a state in which at least one of the two measuring devices collects information (for example records a test signal) which allows a statement to be made on the functionality of the apparatus 100. For example, the measuring device 130 may enter such a test mode automatically when switching on the apparatus 100 or may also enter the test mode at regular or random intervals during operation and may carry out a corresponding functional test.

Optionally, the second measuring device may also additionally record a corresponding test signal or a different test signal in order to also obtain an item of information relating to the functionality of the first measuring device 130. In other words, the second measuring device may optionally additionally record a test signal dependent on the first measuring device 130 via at least one conductor of the two electrical conductors 110 in a test mode, with the result that functionality of the apparatus 100 can be assessed on the basis of the recorded test signal (for example on its own or in combination with other information or recorded test signals). The statements made above with respect to the recording of a test signal by the first measuring device 130 accordingly apply.

As already mentioned, a recorded test signal or information included in the recorded test signal can be compared with a stored or calculated reference or can be made available to an electrical control device for such a comparison. If the two measuring devices provide an electrical control device with corresponding test signals or information, the electrical control device can directly compare the recorded signals or information with one another and can thus assess the functionality of the apparatus 100. Such an electrical control device may be part of the apparatus 100 or may be an external control device (for example control device of a machine or of a vehicle to which the apparatus is connected).

Figure 2:
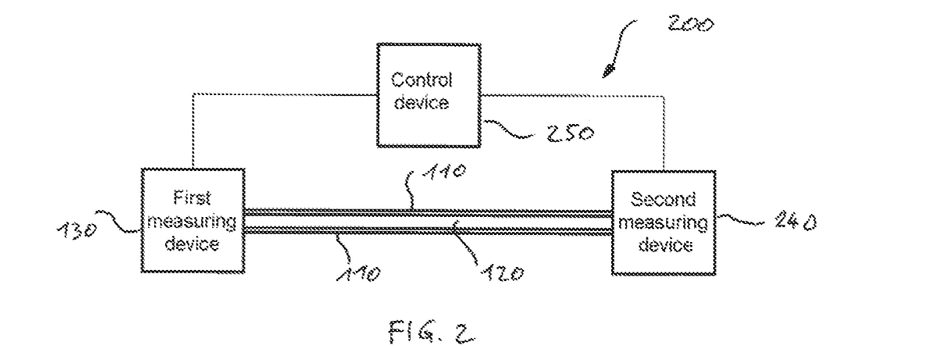
FIG. 2 shows a schematic illustration of an apparatus for detecting a force effect.

FIG. 2 shows a schematic illustration of an apparatus 200 for detecting a force effect with an electrical control device 250 as an exemplary embodiment. The control device 250 may be electrically connected to the two measuring devices 130, 240. As a result, the two measuring devices 130, 240 may transmit recorded test signals or information contained in the recorded test signals to the control device 250.

In other words, an electrical control device 250 may receive a recorded test signal at least from one of the two measuring devices 130, 240 and can compare said test signal with a reference signal or a test signal from the other measuring device in order to be able to assess functionality of the apparatus 200.

Figure 3:
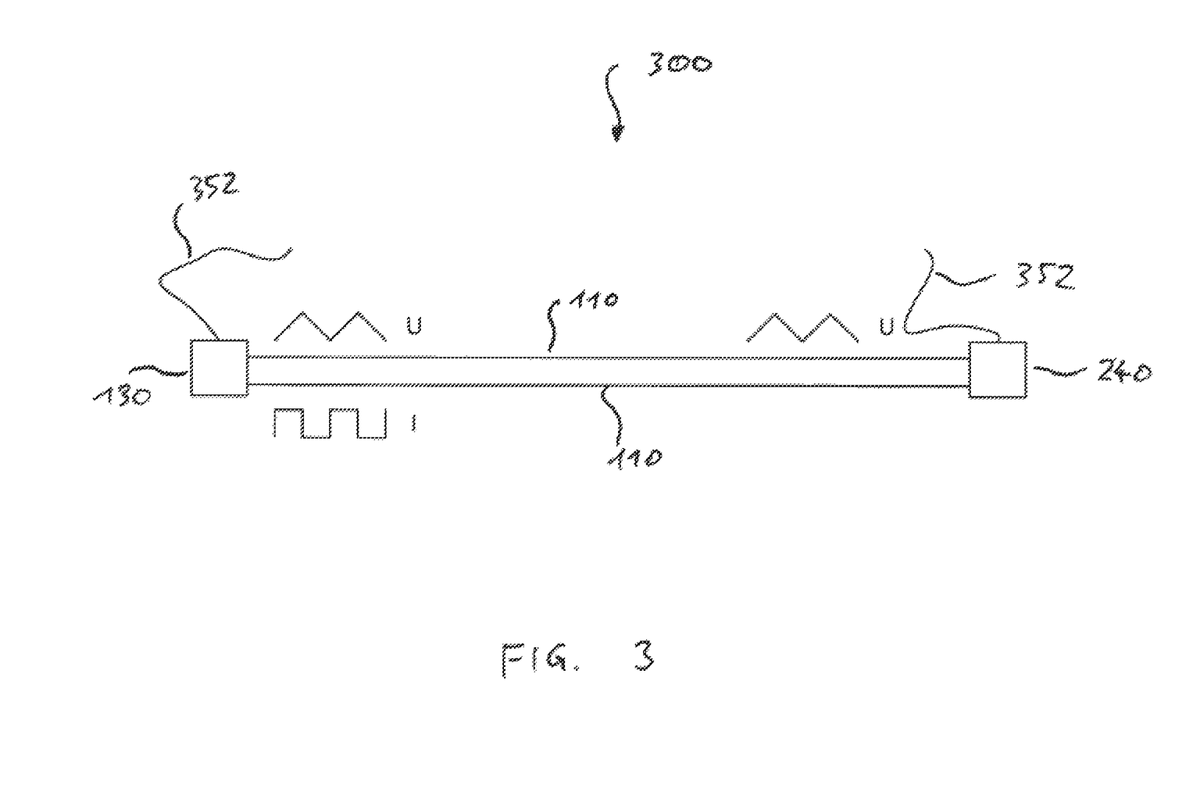
FIG. 3 shows a schematic illustration of an apparatus for detecting a force effect in a test mode.

A test signal may be generated and/or recorded by one or both of the measuring devices 130, 240 in a wide variety of ways. Accordingly, the recorded test signal may contain different information which can be used to assess functionality of the apparatus. For example, an active measuring device (IC) may generate charging currents and discharge currents and may measure an amplitude of the generated voltage signal waveform (as the test signal to be recorded), as illustrated in FIG. 3, for example. The observing IC (second measuring device 240) may optionally likewise measure the amplitude and send the latter to a control device (ECU, Electrical Control Unit) which can confirm that the electrical connection is ok if both measurements are sufficiently similar or identical. The first measuring device 130 may thus send a voltage active side signal, for example, to the control device via an electrical connection 352 and the second measuring device 240 can send a voltage observer side signal to the control device via a corresponding electrical line 352. The control device can compare the two signals with one another. Data can be transmitted between the two measuring devices 130, 240 and the control device via PSI5 (Peripheral Sensor Interface 5), for example. FIG. 3 shows an apparatus 300 as a corresponding example.

In other words, the first measuring device 130 can apply a varying current signal to at least one of the two electrical conductors and can record a resultant voltage signal as a test signal (for example via the other electrical conductor or the same electrical conductor). Furthermore, the second measuring device 240 can record a voltage signal caused by the varying current signal as a test signal. Both measuring devices 130, 240 can then provide an electrical control device with the two recorded voltage signals for a comparison.

Alternatively, the first measuring device 130 (and optionally also additionally the second measuring device) can compare the resultant voltage signal as a test signal with a reference voltage signal.

Alternatively, the first measuring device 130 can also apply a varying voltage signal to at least one of the two electrical conductors and can record a resultant voltage signal and can compare it with a reference value.

In other words, the first measuring device 130 (and optionally additionally also the second measuring device) can apply a varying current signal or a varying voltage signal to at least one of the two electrical conductors and can record a resultant voltage signal or a resultant current signal as a test signal. The first measuring device 130 can then compare the recorded voltage signal or the recorded current signal with a reference voltage signal or a reference current signal. A corresponding situation alternatively also applies to information which is obtained from the recorded voltage signal or the recorded current signal and can be compared with the corresponding reference information.

Alternatively, upon applying a varying voltage signal, the two measuring devices may also record test signals and make them available to the control device for a comparison. For example, the first measuring device 130 can apply a varying voltage signal to at least one of the two electrical conductors 110 and can record a resultant current signal as a test signal. Furthermore, the second measuring device 240 can record a voltage signal resulting from the varying voltage signal. The two measuring devices can then provide an electrical control device with the recorded current signal and the recorded voltage signal in order to compare the varying voltage signal and the recorded voltage signal (or accordingly information obtained therefrom) or to calculate a capacitance of the two electrical conductors 110.

In other words, a similar measurement to that caused by the generated charging current and discharge current can be stimulated by a voltage signal waveform (for example a triangular signal, a square-wave signal or a sinusoidal signal) which is generated by the active measuring device (IC), and the corresponding current can be measured and can be sent to the electrical control device in order to calculate the capacitance. The observer (second measuring device) may in turn measure the voltage on its side in order to check whether the measurement corresponds to the known excitation (of the voltage signal waveform) in an identical or sufficiently similar manner.

Optionally, alternatively or additionally, the observing side (for example second measuring device) can connect a known or defined capacitance in a manner parallel to the lines 110 in order to check whether the measured values (or recorded test signals) change by expected values.

In other words, the second measuring device 240 can connect a reference capacitance to the two electrical conductors 110 in a manner parallel to the two electrical conductors 110 in a test mode of the first measuring device 130. Furthermore, the first measuring device 130 or the second measuring device 240 may compare a change in a test signal to be recorded, which is caused by the reference capacitance, with a reference or can provide an electrical control device with at least one test signal to be recorded for such a comparison.

Such a measurement can be carried out as an alternative or in addition to the voltage and/or current measurements described above.

Likewise optionally, alternatively or additionally, the observing side (for example second measuring device) can connect a resistor to the electrical conductors 110 (for example wires). The first measuring device 130 (active IC) provides, for example, a direct current or a DC voltage (DC) and measures the other variable. The observer (second measuring device) can then measure the voltage drop across the resistor. Both devices can then send their measured values to a control device which can then calculate the resistance of the other elements in the loop (connections, wires and/or switches) from the difference in the voltage drop and knowledge of the test resistance and/or reference resistance.

In other words, the second measuring device 240 can connect a reference resistor to the two conductors 110 in a test mode of the first measuring device 130. The first measuring device 130 can then apply a voltage signal or current signal to at least one of the two electrical conductors and can record a resultant current signal or a resultant voltage signal as a test signal. Furthermore, the second measuring device 240 can record or measure a voltage drop across the reference resistor which occurs on the basis of the voltage signal or current signal which has been fed in. The first measuring device 130 and/or the second measuring device 240 may compare the recorded current signal or voltage signal and/or the recorded voltage drop with a reference or may provide an electrical control device with at least one recorded signal for such a comparison.

As an alternative or in addition to the possibilities described above, the wires can also be used as communication lines and a message can be interchanged. Both sides can then provide a control device with the message in order to check whether it is identical or sufficiently similar. Alternatively, the message may have, for example, a long checksum which can be evaluated by the respective receiver side.

In other words, the first measuring device 130 and the second measuring device 240 may interchange a message via at least one of the two electrical conductors 110 (or else via both conductors in order to test both conductors), which message has an item of information relating to functionality of the apparatus (for example, as a result of the fact that a message arrives, an item of information which makes a statement on the functionality of the conductor used for transmission may automatically be present) or on the basis of which message an item of information relating to functionality of the apparatus can be determined.

The described possibilities for assessing functionality of the apparatus are exemplary implementation possibilities. However, it is also possible to record other measurements or other test signals in order to be able to make such a statement on the functionality.

Furthermore, the measuring devices (ICs) can alternatively carry out the consistency check on the basis of known values (reference signals or reference values) and tolerances for all cases described, for example, instead of transmitting the data to a control device.

Likewise, in most of the examples, the first measuring device 130 is described as the active side and the second measuring device 240 is described as the observer side. However, this may equally be the reverse. Alternatively, after a measuring sequence has ended, the function of the active measuring device (IC) and of the observer can also be swapped.

As already mentioned, there are different possibilities for the measuring device to detect a force effect. The connection via the two electrical conductors 110 makes it possible to carry out this detection by means of electrical measurements. In other words, both measuring devices 130, 240 may detect a change in an electrically measurable variable of at least one conductor of the two electrical conductors 110, which change is caused by a change in the distance between the two electrical conductors at at least one place. The electrically measurable variable may be different for different measuring methods or concepts. For example, at least the length of the deformed conductor can be changed by changing the distance between the two conductors 110, with the result that an electrical resistance of the conductor can easily change. However, the capacitance between the two electrical conductors 110 can change more significantly. In this respect, the electrically measurable variable may be, for example, a capacitance between the two electrical conductors.

A line capacitance can be measured in different ways. For example, the line capacitance can be measured using a switched capacitive circuit which charges at least one line to different voltages during at least two successive phases. During at least one of the voltage transitions, the charge needed to charge the line to the changed voltage can be measured. The charging and the charge measurement can be carried out by each of the two measuring devices (IC1, IC2). Four different measurements can be enabled as a result, for example. The first measuring device 130 can charge and the first measuring device 130 can measure, the first measuring device 130 can charge and the second measuring device 240 can measure, the second measuring device 240 can charge and the first measuring device 130 can measure or the second measuring device 240 can charge and the second measuring device 240 can measure. It may be sufficient to carry out one of these measurements. However, a plurality of these measurements can also be carried out and the results can be compared with one another.

In other words, the first measuring device 130 or the second measuring device 240 can generate two different potential differences between the two electrical conductors 110 at least in succession. In this case, the first measuring device 130 or the second measuring device 240 can measure a charge needed to change a potential difference between the two electrical conductors from a first potential difference of the at least two different potential differences to the second potential difference of the at least two different potential differences.

This makes it possible to easily carry out a capacitance measurement. If the measured capacitance changes, the distance between the two conductors 110 has changed and a force effect which has caused this change can be detected.

Optionally, in addition or as an alternative to detection based on an electrical measurement, the force effect can also be detected on the basis of a pressure measurement. If the spacer between the two electrical conductors 110 (for example wires) is namely a tube or generally has a cavity, the two measuring devices 130, 240 may be or have pressure sensors and may measure a pressure-dependent and/or capacitance-dependent signal and provide a control device with both values. This may provide additional diversity between the measurement principles in order to increase the safety level. Alternatively, only a pressure measurement may also be carried out and the two electrical conductors 110 may only be used to test the functionality.

For example, one measuring device may also have a pressure sensor and may detect a force effect on the basis of a pressure measurement and the other measuring device may detect the force effect on the basis of a measurement of the capacitance of the two conductors 110.

In other words, the spacer 120 may generally be a tube which is connected to at least one of the two measuring devices. Furthermore, at least one of the two measuring devices 130, 240 has a pressure sensor. The at least one of the two measuring devices 130, 240 can then detect a change in a pressure in the tube, which change is caused by a change in the distance between the two electrical conductors 110 which is caused by a force effect at at least one place, in order to detect the force effect.

For example, a tube may be arranged in the deformable region of a bumper and may be connected to a pressure sensor on both sides. If the car hits a pedestrian, for example, the deformable region is compressed and the tube volume is reduced. Consequently, the pressure is increased and both sensors measure an abrupt pressure increase. A decision with respect to pedestrian protection can be made, for example, depending on the level and dynamics of the pressure increase.

Since pedestrian protection is a topic relevant to safety, for example, two redundant sensors can be used at different positions on the bumper. As a result of the described concept, there may be uncertainty as to whether the tube is still undamaged and is tightly connected to the two pressure sensors. This can be tested when starting up the system, for example, which can considerably increase the functional safety of the system.

The two electrical conductors may have virtually any desired length. Accordingly, the measuring devices 130, 240 may also be arranged at virtually any desired distance from one another in order to be able to detect a force effect over a corresponding distance. In many applications, the desire is to be able to detect a force effect over a distance of more than 20 cm, more than half a meter, more than one meter, more than two meters, more than five meters or more than ten meters. In other words, each of the two electrical conductors may have a length of, for example, at least half a meter (or at least 20 cm, one meter, two meters, five meters or at least ten meters), with the result that the two measuring devices 130, 240 can be arranged at least half a meter (or at least 20 cm, one meter, two meters, five meters or at least ten meters) away from one another.

The two electrical conductors 110 may be connected in a manner directly adjoining the spacer 120 or may be indirectly connected to one or more intermediate layers which are likewise deformable. For example, the two electrical conductors 110 may be fastened to two opposite sides of the spacer 120. However, they may also be sides which are not opposite, as long as the spacer can ensure that the two electrical conductors 110 keep a sufficient distance from one another if no force acts or a constant force acts.

The two electrical conductors 110 may have any desired cross section. The cross section of the two electrical conductors 110 may be substantially identical or the same or else may be different. For example, the two electrical conductors 110 may be in the form of wires with a substantially circular cross section or may be in the form of ribbon-like wires (for example with a cross section which extends considerably further in one direction than in the other, for example a rectangular cross section). In the case of ribbon-like conductors, the two conductors 110 may be opposite one another such that the two conductors have the greatest possible capacitance. In other words, the two electrical conductors may be ribbon-like and may be arranged such that substantially the large sides (side of the cross section in which the cross section extends considerably further than in the other direction) of the ribbon-like geometry are opposite one another.

Some exemplary embodiments relate to a bumper of a vehicle or application of the described concept to a bumper of a vehicle. In this case, an apparatus according to the concept described above or according to one of the exemplary embodiments described above can be directly or indirectly connected to the bumper, with the result that, in the event of an impact with an object (for example another vehicle or a pedestrian), the distance between the two electrical conductors is changed at at least one place as a result of a resulting force effect on the apparatus.

Figure 4:
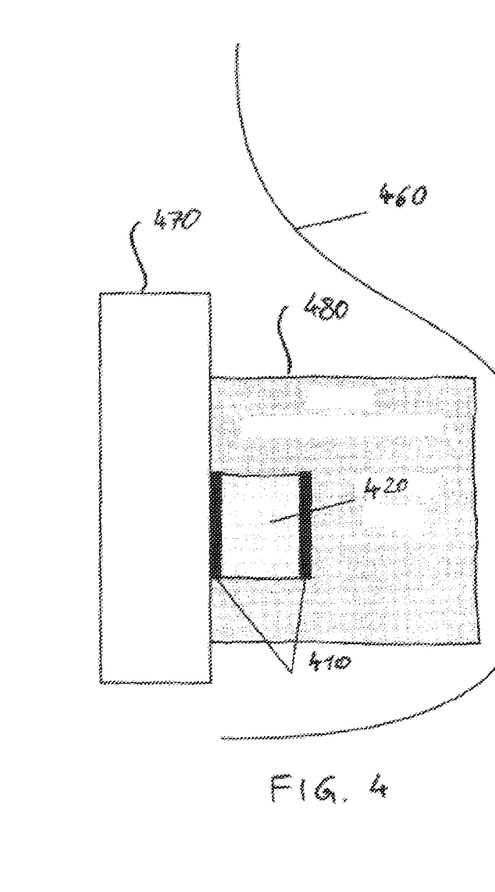
FIG. 4 shows a schematic cross section of an apparatus for detecting a force effect which is arranged in the region of a bumper of a vehicle.
Figure 5:
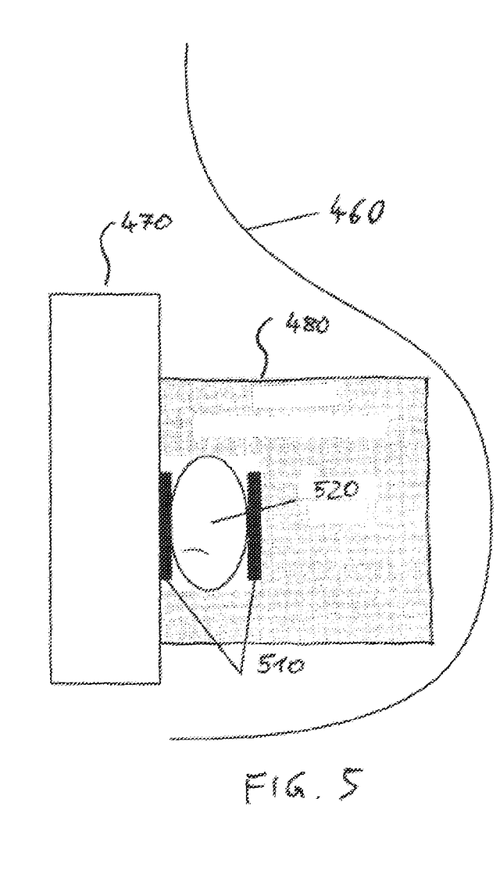
FIG. 5 shows a schematic illustration of an apparatus for detecting a force effect which is arranged in the region of a bumper of a vehicle.

FIGS. 4 and 5 show for this purpose examples of a cross section of a bumper having an apparatus according to the described concept. In FIG. 4, the two electrical conductors 410 with the spacer 420 in between them are connected to a supporting component (for example bar) of the bumper or of a vehicle. The two electrical conductors are in the form of ribbon-like conductors and the spacer 420 is, for example, a foam body having a rectangular cross section. In addition, the remaining intermediate space between the supporting component 470 and a surface of the bumper 460 is at least partially filled with a foam 480 which is used as an energy absorber, for example. The example from FIG. 5 differs therefrom in that the two electrical conductors 510 (for example wires) are arranged on a spacer tube 520. This also makes it possible to detect a force effect on the basis of a pressure measurement.

Measurements can now be used to determine, for example, the capacitance between the two electrical conductors which are arranged in such a manner that they move toward one another if the bumper is deformed. This can be achieved in a very simple manner by arranging the two electrical conductors inside the foam 480. Alternatively, the two conductors can be arranged on two sides of a tube which are used to connect the pressure sensors of the measuring devices. In the latter case, a combination of a pressure measurement and a capacitance measurement can be implemented, for example.

Figure 6:
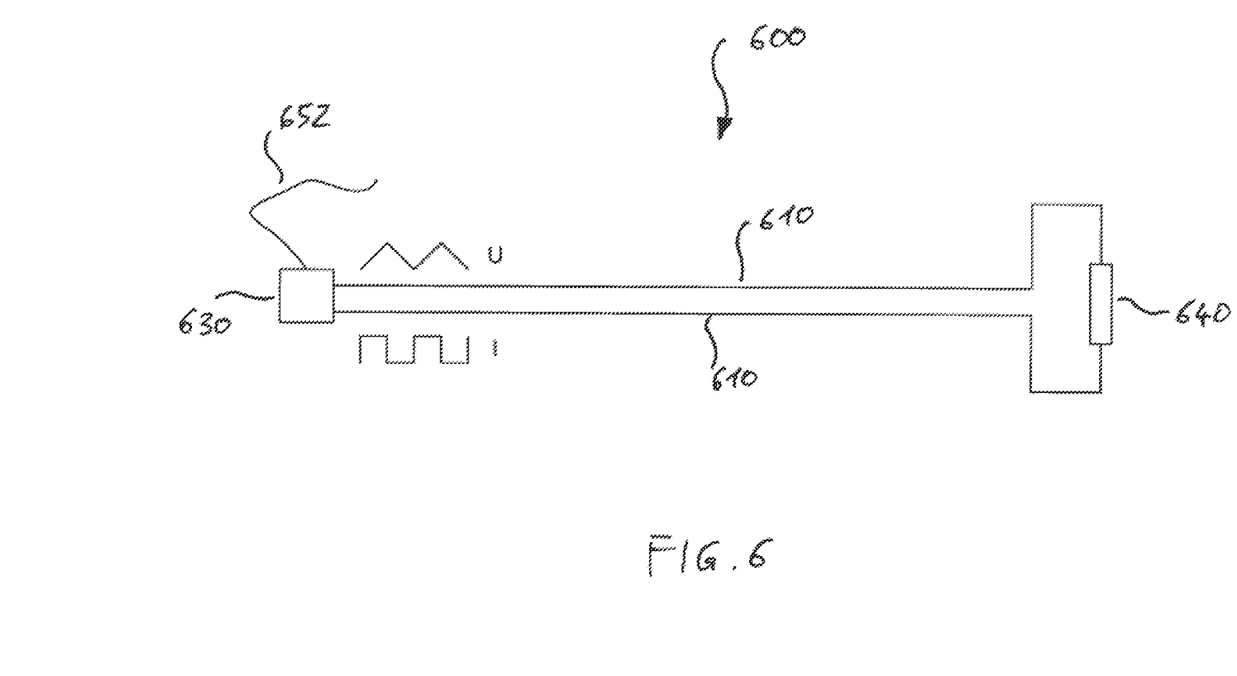
FIG. 6 shows a schematic illustration of an apparatus for detecting a force effect.

FIG. 6 shows a schematic illustration of an apparatus 600 for detecting a force effect according to one exemplary embodiment. The apparatus 600 has two electrical conductors 610 which run at a distance from one another and a deformable spacer which is arranged between the two electrical conductors 110. Furthermore, the apparatus 600 comprises a measuring device 630 which is electrically connected to one end of the two electrical conductors 610 in each case and a (non-reactive) resistor 640 (as an example of an electrical element) which is arranged between the two other ends of the two electrical conductors 610. The measuring device 630 may detect a capacitance change between the two electrical conductors 610 which is caused by a change in the distance between the two electrical conductors 610 which is caused by a force effect at at least one place along the two electrical conductors 610, in order to detect a force effect.

This makes it possible to implement a system having only one measuring device (IC) and a resistive termination on the opposite side in a very simple and cost-effective manner. The capacitance between the two electrical conductors 610 (for example wires) can be measured in this case, for example, if the measurement is carried out more quickly than the discharge time constant which is given by the resistance and capacitance between the two conductors 610. For a connection test, the resistance 640 can then be measured using a direct current measurement (DC). It is not possible to achieve the same safety level as with a system with two measuring devices (ICs), but it can be used, for example, in similar uses with lower safety requirements.

For example, such apparatuses can be used as jamming protection (for example in the case of window winders).

As indicated in FIG. 6, the measuring device 630 may apply, for example, a varying voltage signal or a varying current signal to at least one of the two conductors 610 and may record a corresponding current signal or voltage signal as a test signal. The measuring device 630 can compare this test signal with a reference or can transmit said test signal, via a connection 652, to a control device (ECU) for such a comparison. In this respect, the measuring device 630 forms a voltage active side, for example, and can be connected to the control device via PSI5, for example.

The apparatus 600 may implement further optional, additional or alternative aspects which have been explained in connection with the previously described concept or one or more exemplary embodiments described above.

Figure 7:
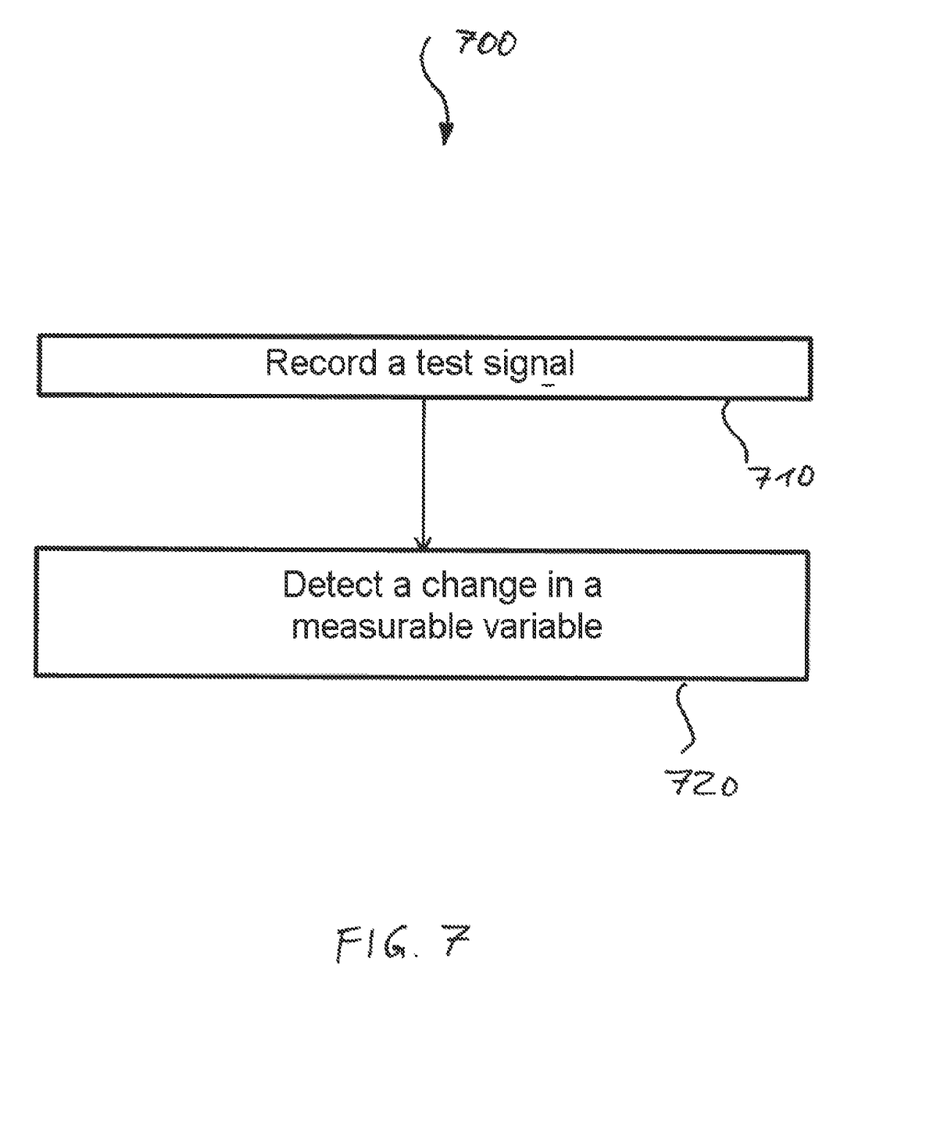
FIG. 7 shows a flowchart of a method for detecting a force effect.

FIG. 7 shows a flowchart of a method 700 for detecting a force effect according to one exemplary embodiment. The method 700 may detect the force effect by means of an apparatus for detecting a force effect, which apparatus has two electrical conductors which run at a distance from one another, a deformable spacer which is arranged between the two electrical conductors, a first measuring device which is electrically connected to one end of the two electrical conductors in each case and an electrical component which is electrically connected to the respective other end of the two electrical conductors. The method 700 involves recording 710 a test signal dependent on the electrical component using at least one conductor of the two electrical conductors in a test mode of the first measuring device, with the result that functionality of the apparatus can be assessed on the basis of the first test signal. Furthermore, the method 700 involves detecting 720 a change in a variable which can be measured by the measuring device, which change is caused by a change in the distance between the two electrical conductors which is caused by a force effect at at least one place along the two electrical conductors, in order to detect the force effect.

The method 700 may have further optional, additional or alternative method steps which correspond to optional, additional or alternative refinements of the concept described above.

Some exemplary embodiments relate to an apparatus for detecting an impact of a vehicle with an object (for example another vehicle or a pedestrian) or generally to an impact sensor (for example generally for a mobile object) having an apparatus for detecting a force effect according to the concept described above or one of the examples described.

Some exemplary embodiments relate to a pedestrian protection sensor having diagnostics for functional safety. For example, the proposed concept can be used to detect when a pedestrian is hit by a bumper of a vehicle. The described concept can be used to implement a system which (for example with respect to the ability to be arranged on a bumper of a vehicle) is similar to a system used, in particular with respect to the mechanics (cost reduction) and the detection zone (for example in order to obtain qualified functionality). The proposed system can improve the self-test capability (for example for ISO 26262 conformity).

For example, the proposed system can achieve this by replacing the tube with two wires having a particular spacer in between them (for example a similar tube or a deformable foam which surrounds the previous tube). In this example, the two pressure sensors can be replaced with ASICs (application-specific integrated circuits) which measure the capacitance between the two wires and detect an increase in the capacitance in the event of a collision with a pedestrian. In addition, the two ASICs (first measuring device and second measuring device) can observe or record electrical signals which are generated by their counterpart on the opposite side of the wires in order to check the correct connection. These signals may be identical to the signals for the capacitance measurement but may also be different measurements, such as measurement of a contact resistance or interchange of a communication protocol via the two measuring wires.

One point is the interchange of electrical signals between the two ICs (measuring devices) which are used to measure the capacitance between the two wires. This observation function can be implemented using many different principles or combinations thereof, as already described above.

The features disclosed in the above description, the following claims and the accompanying figures can be important and implemented both individually and in any desired combination for the implementation of an exemplary embodiment in its various refinements.

Although some aspects have been described in connection with an apparatus, it goes without saying that these aspects are also a description of the corresponding method, with the result that a block or a component of an apparatus can also be understood as meaning a corresponding method step or a feature of a method step. In a similar manner, aspects which have been described in connection with a method step or as a method step are also a description of a corresponding block or detail or feature of a corresponding apparatus.

Depending on particular implementation requirements, exemplary embodiments of the invention can be implemented using hardware or software. Implementation can be carried out using a digital storage medium, for example a floppy disk, a DVD, a Blu-ray disc, a CD, a ROM, a PROM, an EPROM, an EEPROM or a flash memory, a hard disk or another magnetic or optical memory which stores electronically readable control signals which can interact or interact with a programmable hardware component in such a manner that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field-programmable gate array (FPGA) having a microprocessor.

The digital storage medium may therefore be machine-readable or computer-readable. Some exemplary embodiments therefore comprise a data storage medium having electronically readable control signals which are able to interact with a programmable computer system or a programmable hardware component in such a manner that one of the methods described herein is carried out. One exemplary embodiment is therefore a data storage medium (or a digital storage medium or a computer-readable medium) on which the program for carrying out one of the methods described herein is recorded.

Generally, exemplary embodiments of the present invention can be implemented in the form of a program, firmware, a computer program or a computer program product having program code or in the form of data, the program code or the data being effective to the effect that one of the methods is carried out if the program runs on a processor or a programmable hardware component. The program code or the data may also be stored, for example, on a machine-readable carrier or data storage medium. The program code or the data may be in the form, inter alia, of source code, machine code or byte code or another intermediate code.

Another exemplary embodiment is also a data stream, a signal train or a sequence of signals representing the program for carrying out one of the methods described herein. The data stream, the signal train or the sequence of signals may be configured, for example, to the effect of being transferred via a data communication connection, for example via the Internet or another network. Exemplary embodiments are therefore also signal trains which represent data and are suitable for transmission via a network or a data communication connection, the data representing the program.

A program according to one exemplary embodiment can implement one of the methods during its execution, for example, by virtue of the program reading memory locations or writing a data item or a plurality of data items to these memory locations, thus possibly causing switching operations or other operations in transistor structures, in amplifier structures or in other electrical, optical or magnetic components or components operating according to a different functional principle. Accordingly, data, values, sensor values or other information can be recorded, determined or measured by a program by reading a memory location. A program can therefore record, determine or measure variables, values, measurement variables and other information by reading one or more memory locations and can effect, cause or carry out an action and can control other devices, machines and components by writing to one or more memory locations.

The exemplary embodiments described above are only an illustration of the principles of the present invention. It goes without saying that modifications and variations of the arrangements and details described herein will be apparent to other specialists. Therefore, the intention is to restrict the invention only by the scope of protection of the patent claims below and not by the specific details which were presented using the description and the explanation of the exemplary embodiments herein.

The invention claimed is:

1. An apparatus for detecting a force effect, comprising:
two electrical conductors that run substantially in parallel to one another and spaced longitudinally at a distance from one another;
a deformable spacer arranged between the two electrical conductors;
a first measuring device electrically connected to one end of each of the two electrical conductors;
a second measuring device electrically connected to a respective other end of the two electrical conductors such that the first and second measuring devices are electrically connected to one another by the two electrical conductors,
wherein the first measuring device is configured to detect a change in a first variable caused by a change in the distance between the two electrical conductors that occurs in response to a force effect applied to the apparatus; and
wherein the second measuring device is configured to detect a change in a second variable caused by the change in the distance between the two electrical conductors that occurs in response to the force effect applied to the apparatus.

2. The apparatus as claimed in claim 1, wherein the first measuring device is configured to record a test signal dependent on the electrical component using at least one of the two electrical conductors in a test mode, such that functionality of the apparatus can be assessed on the basis of the recorded test signal.

3. The apparatus as claimed in claim 1, wherein the second measuring device is configured to record a test signal dependent on the first measuring device using at least one of the two electrical conductors in a test mode, such that functionality of the apparatus can be assessed on the basis of the recorded test signal.

4. The apparatus as claimed in claim 1, wherein the first measuring device is configured to apply a varying current signal to at least one of the two electrical conductors and to record a resultant voltage signal as a test signal, the second measuring device configured to record a voltage signal resulting from the varying current signal, the two measuring devices configured to provide an electrical control device with the two recorded voltage signals for a comparison.

5. The apparatus as claimed in claim 1, wherein the first measuring device is configured to apply a varying current signal or a varying voltage signal to at least one of the two electrical conductors and to record a resultant voltage signal or a resultant current signal as a test signal, the first measuring device configured to compare the recorded voltage signal or the recorded current signal with a reference voltage signal or a reference current signal, respectively.

6. The apparatus as claimed in claim 1, wherein the first measuring device is configured to apply a varying voltage signal to at least one of the two electrical conductors and to record a resultant current signal as a test signal, the second measuring device configured to record a voltage signal resulting from the varying voltage signal, the two measuring devices configured to provide an electrical control device with the recorded current signal and the recorded voltage signal for comparing the varying voltage signal and the recorded voltage signal or for calculating a capacitance of the two electrical conductors.

7. The apparatus as claimed in claim 1, wherein the second measuring device is configured to connect a reference capacitance to the two electrical conductors in a manner parallel to the two electrical conductors in a test mode of the first measuring device, the first measuring device or the second measuring device configured to compare a change in a test signal to be recorded, as caused by the reference capacitance, with a reference or to provide an electrical control device with at least one test signal to be recorded for such a comparison.

8. The apparatus as claimed in claim 1, wherein the second measuring device is configured to connect a reference resistor to the two electrical conductors in a test mode of the first measuring device, the first measuring device configured to apply a voltage signal or a current signal to at least one of the two electrical conductors and to record a resultant current signal or a resultant voltage signal, respectively, as a test signal, the second measuring device configured to record a voltage drop across the reference resistor that occurs on the basis of the voltage signal or current signal that has been fed in, the first measuring device or the second measuring device configured to compare the recorded current signal or voltage signal or the recorded voltage drop with a reference or to provide an electrical control device with at least one recorded signal for such a comparison.

9. The apparatus as claimed in claim 1, wherein the first measuring device and the second measuring device are configured to interchange at least one message via at least one of the two electrical conductors, wherein the message has an item of information relating to functionality of the apparatus or on the basis of the message an item of information relating to functionality of the apparatus can be determined.

10. The apparatus as claimed in claim 1, wherein both measuring devices are configured to record a change in an electrically measurable variable caused by a change in the distance between the two electrical conductors at at least one place.

11. The apparatus as claimed in claim 10, wherein the electrically measurable variable is a capacitance between the two electrical conductors.

12. The apparatus as claimed in claim 10, wherein the first measuring device or the second measuring device is configured to generate two different potential differences between the two electrical conductors at least in succession, the first measuring device or the second measuring device configured to measure a charge needed to change a potential difference between the two electrical conductors from a first potential difference of the at least two different potential differences to the second potential difference of the at least two different potential differences.

13. The apparatus as claimed in claim 1, further comprising an electrical control device, the control device configured to receive a recorded test signal from at least one of the two measuring devices and to compare the test signal with a reference signal or a test signal from the other measuring device in order to assess functionality of the apparatus.

14. The apparatus as claimed in claim 1, wherein the two electrical conductors are fastened to two opposite sides of the spacer.

15. The apparatus as claimed in claim 1, wherein the spacer comprises a tube or a foam body.

16. The apparatus as claimed in claim 1, wherein the spacer comprises a tube connected to at least one of the two measuring devices, at least one of the two measuring devices comprising a pressure sensor, at least one of the two measuring devices configured to detect a change in a pressure in the tube caused by a change in the distance between the two electrical conductors caused by a force effect at at least one place, in order to detect the force effect.

17. The apparatus as claimed in claim 1, wherein each of the two electrical conductors is at least about half a meter long, such that the first measuring device and the electrical component can be arranged at least about half a meter away from one another.

18. The apparatus as claimed in claim 1, wherein the two electrical conductors are ribbon-like and arranged such that larger sides of the ribbon-like geometry are substantially opposite one another.

19. A bumper of a vehicle comprising:
an apparatus comprising
two electrical conductors that run substantially in parallel to one another and spaced longitudinally at a distance from one another;
a deformable spacer arranged between the two electrical conductors;
a first measuring device electrically connected to one end of each of the two electrical conductors;
a second measuring device electrically connected to a respective other end of the two electrical conductors such that the first and second measuring devices are electrically connected to one another by the two electrical conductors,
wherein the first measuring device is configured to detect a change in a first variable caused by a change in the distance between the two electrical conductors; and
wherein the second measuring device is configured to detect a change in a second variable caused by the change in the distance between the two electrical conductors;
wherein the apparatus is directly or indirectly connected to the bumper such that, in the event of an impact with an object, the distance between the two electrical conductors is changed as a result of a resulting force effect on the bumper.

20. A method for detecting a force effect by an apparatus for detecting a force effect, wherein the apparatus comprises two electrical conductors that run substantially in parallel to one another and spaced longitudinally at a distance from one another, a deformable spacer arranged between the two electrical conductors, a first measuring device electrically connected to one end of each of the two electrical conductors a second measuring device that is electrically connected to a respective other end of the two electrical conductors such that the first and second measuring devices are electrically connected to one another by the two electrical conductors, wherein the first measuring device and the second measuring device are configured to detect a change in respective first and second variables caused by the change in the distance between the two electrical conductors that occurs in response to the force effect applied to the apparatus, the method comprising:
generating a test signal with the first measuring device and applying the test signal to the apparatus,
recording a first result of the test signal with the first measuring device,
recording a second result of the test signal with the second measuring device;
comparing the first result to the second result, such that functionality of the apparatus can be assessed on the basis of the comparison.

21. The apparatus as claimed in claim 1, wherein the first variable is capacitance between the two electrical conductors and the second variable is pressure within the spacer.

22. The apparatus as claimed in claim 1, further comprising a controller configured to:
receive a first signal from the first measurement device that is indicative of the detected change in the first variable;

receive a second signal from the second measurement device that is indicative of the detected change in the second variable;
compare the first signal to the second signal; and
assess functionality of the apparatus based at least on a result of the comparison.

\* \* \* \* \*